L. Bornemann.
Watch-Chain Attachment.
Nº 40,790.          Patented Dec. 1, 1863.
Fig: 1
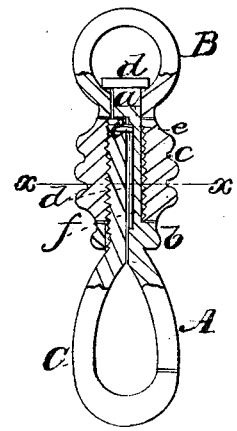
Fig: 2
Witnesses:
Daniel Robertson
M. S. Partridge
Inventor:
Louis Bornemann

UNITED STATES PATENT OFFICE.

LOUIS BORNEMANN, OF HUDSON CITY, ASSIGNOR TO AUGUST HAMANN, OF HOBOKEN, NEW JERSEY.

SWIVEL-HOOK FOR WATCH-CHAINS, &c.

Specification forming part of Letters Patent No. 40,790, dated December 1, 1863.

*To all whom it may concern:*

Be it known that I, LOUIS BORNEMANN, of Hudson City, in the county of Hudson and State of New Jersey, have invented a new and Improved Swivel-Hook for Watches, Watch-Chains, &c.; and I do hereby declare that the following is a full, clear, and exact description of the same, reference being had to the accompanying drawings, forming a part of this specification, in which—

Figure 1 represents a sectional side elevation of my invention. Fig. 2 is a transverse section of the same.

Similar letters of reference indicate corresponding parts in both figures.

The object of this invention is a swivel-hook which will open and close by the action of a screw-barrel without a hinge and by a positive motion in such a manner that by imparting to said screw-barrel a rotary motion the movable part of the hook will slide in or out, and that the hook when it is closed is not liable to open spontaneously.

To enable those skilled in the art to make and use my invention, I will proceed to describe it.

A represents that portion of the hook which is rigidly attached to the shank $a$. The shank is provided with a collar, $b$, at one end, and it passes through the barrel $c$ and through the ring B, and after it has been inserted into these parts it is riveted over or provided with a head, $d$, so that the ring B can rotate freely between said head and the end of the barrel $c$. The barrel $c$ rotates freely between the collar $b$ and the inner end of the ring B, so that it is not allowed to move on the stem in a longitudinal direction. The barrel $c$ is provided with an internal screw-thread, which screws on the semicircular shank $d$ of the movable portion G of the hook. This shank passes through a semicircular opening in the collar $b$, and its flat surface fits on a corresponding flat surface filed or otherwise produced on the shank $a$ of the stationary part A of the hook. A pin, $e$, inserted into the end of the semicircular shank $d$, projects into a groove, $f$, in the flat surface of the shank $a$, and forms a stop to prevent the movable part of the hook from dropping out if the motion of the barrel is continued any longer than necessary to open the hook.

If it is desired to open the hook, the barrel $c$ is turned and the shank $d$ slides over the shank $a$, causing the movable portion of the hook to move out until the stop $e$ strikes the end of the groove $f$ in the shank $a$. The ring of a watch or any other article can now be introduced into the hook, and when the hook is closed said article is securely confined. The hook is not liable to open spontaneously. It can only be opened by turning the barrel $c$ in the proper direction. At the same time the ring B is perfectly free to rotate in either direction, so that the hook can be used in any place where a curved hook is applicable.

The manufacture of my hook is cheaper than that of hooks of the ordinary construction, and it is not liable to get out of order or become deranged from slight mismanagement, and it is not liable to open spontaneously.

What I claim as new, and desire to secure by Letters Patent, is—

1. The semicircular shank $d$ of the movable part C of the hook, in combination with the screw-barrel $c$ and shank $a$ of the stationary part A, constructed and operating in the manner and for the purpose substantially as shown and described.

2. The stop $e$ in the end of the semicircular shank $d$, in combination with a groove or its equivalent in the stationary shank $a$, as set forth.

LOUIS BORNEMANN.

Witnesses:
 DANIEL ROBERTSON,
 G. W. REED.